United States Patent [19]

Rosner

[11] 4,329,578
[45] May 11, 1982

[54] OPTICAL IMAGING SYSTEM HAVING VARIABLE FOCAL LENGTH

[75] Inventor: Ortwin Rosner, Munich, Fed. Rep. of Germany

[73] Assignee: Rollei-Werke Franke & Heidecke GmbH & Co., Brunswick, Fed. Rep. of Germany

[21] Appl. No.: 157,035

[22] Filed: Jun. 6, 1980

[30] Foreign Application Priority Data

Jun. 27, 1979 [DE] Fed. Rep. of Germany ....... 2925906

[51] Int. Cl.³ .............................................. G03B 3/00
[52] U.S. Cl. ..................................... 250/201; 354/25
[58] Field of Search ............ 250/201, 204; 354/25 N, 354/25 R, 195, 197; 356/4

[56] References Cited

U.S. PATENT DOCUMENTS 4,083,057  4/1978  Quinn ............................. 354/25 N

*Primary Examiner*—David C. Nelms
*Assistant Examiner*—Darwin R. Hostetter
*Attorney, Agent, or Firm*—Staas & Halsey

[57] ABSTRACT

An imaging system, particularly for application in a camera with a zoom lens, having at least two lenses with variable distance from a fixed image plane, means for adjusting one of the lenses for setting the resultant focal length of the system, and automatic means for adjusting the position of the other lens, or of the entire lens system including any other lenses, by means of a focus determining element in the fixed image plane.

14 Claims, 2 Drawing Figures

OPTICAL IMAGING SYSTEM HAVING VARIABLE FOCAL LENGTH

BACKGROUND OF THE INVENTION

1. Field of the Invention

The invention relates to an optical imaging system with a variable focal length, more particularly a zoom lens for photographic cameras.

2. Description of the Prior Art

A hitherto known imaging system with a variable focal length has in its simplest form two lenses, the lens interval being varied along the optical axis in order to set the focal length and the focusing of one lens being effected in a definite relationship to the focusing of the other lens. This relationship is expressed by the following equations:

$$L_1 = f_1^* - \frac{f_2^*}{f_1^*} \frac{(f_1^* - f_{12}^*)^2}{f_{12}^*} \tag{1}$$

$$s^* = f_2^* - \frac{f_2^*}{f_1^*} f_{12}^* \tag{2}$$

where $L_1$ is the distance of the front lens from the fixed focal plane, $s^*$ is the distance of the rear lens from the fixed focal plane, $f_1^*$ is the image-side focal length of the first lens, $f_2^*$ is the image-side focal length of the second lens, and $f_{12}^*$ is the resultant focal length of the optical system.

In FIG. 1 of the drawing, this relationship is shown graphically, in which the distance of each lens from the focal plane $L_1$ and $s^*$ are plotted as functions of the resultant focal length $f_{12}^*$. It is readily apparent that the rear lens is to be focused linearly with the desired resultant focal length $f_{12}^*$, and that the front lens is located in accordance with a second order curve. If this relationship is properly maintained, the position of the focal plane remains constant with any resultant focal length.

In the prior optical imaging system of this kind, cams corresponding to equations (1) and (2) are milled in the cylinder jacket to realize the relationship for focusing the front and the rear lens. The cylinder can be rotated about its axis. Both lenses are placed inside the cylinder with allowance for sliding in axial direction and are carried in the cams of the cylinder with mounting brackets. This construction ensures controlled coupling of the lens intervals which correspond to the above equations.

The fabrication effort for a mechanically compensated optical imaging system of this type is considerable. The cams in the cylinder must be milled with a high degree of finishing accuracy. Even close tolerances in the cams lead to deviations from the desired values of the lens positions and, thereby, to deviations from the desired positions of the image plane, thus leading to pronounced deterioration of the image in the fixed receiving plane.

SUMMARY OF THE INVENTION

The primary object of the invention is to provide an optical imaging system having a variable focal length of the kind referred to above and characterized by a minor fabrication effort and an excellent image-forming quality.

In the optical imaging system according to the invention, the mechanically controlled coupling between the lenses or lens components moving relatively to one another is dispensed with, as the focal length is being varied or adjusted. The elaborate and costly milling of cams in rotary cylinder components with extremely close tolerances is completely eliminated. Thus, the labor cost for producing the system can be substantially reduced. The mechanically controlled coupling is replaced by an electronic control unit which not only costs less but also ensures an exact positioning of the image plane of the system. The focusing device can be a known construction already introduced into the market to further reduce the production cost. These can also allow problem-free changing of lenses, during which lenses with different zoom ranges and different optical data of the lenses or lens components can be used with only minor changes and with corresponding adaptations of the focusing device or the control unit for the particular lenses chosen.

Useful in a photographic, portrait or cinematographic camera, the imaging system according to the invention yields the further advantage that during the zooming moving objects do not come out of the adjusted depth of field of the focused distance, which can lead to a blurring of the picture, because the setting of the focal distance according to the invention occurs via the "sharp image" criterion so that the object is also sharply imaged at all times.

In photograhic cameras which are to be provided with automatic distance focusing, this results in the advantage that only one focusing device need be provided for the adjustment of the focal length of the lens and for the focusing. Thus, in the case of "fully automatic" cameras, a further step has been taken towards the reduction of the manufacturing cost.

Other embodiments and modifications of the present invention will be obvious to a skilled worker in the art.

BRIEF DESCRIPTION OF THE DRAWINGS

The invention is described with reference to the drawings, in which.

DETAILED DESCRIPTION OF THE PREFERRED EMBODIMENTS

Figure 1:
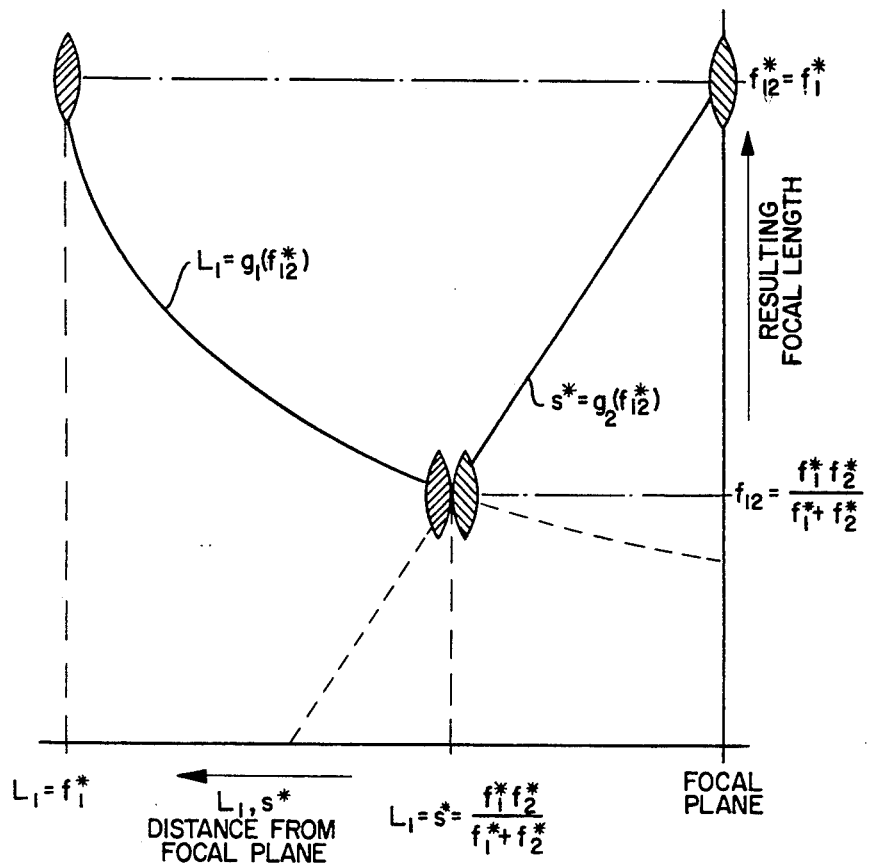
FIG. 1 is a graphical representation of the relationship between the positions of two lenses of an optical imaging system which allows for adjustment of the resultant focal length of the lens system.

In FIG. 1 there is plotted on the y-coordinate the resultant focal length $f_{12}^*$ of the optical imaging system and on the x-coordinate the distance of each lens of the imaging system from the fixed focal or image plane. The plotted curves represent the distances of the lenses from the focal plane, with $L_1 = g_1(f_{12}^*)$ for the front (first) lens and $s^* = g_2(f_{12}^*)$ for the rear (second) lens, where the functions $g_1$ and $g_2$ correspond to the equations (1) and (2) above. This graphical representation serves to clarify the relationship between the positional changes of the two lenses in the optical imaging system moving relatively to one another.

Figure 2:
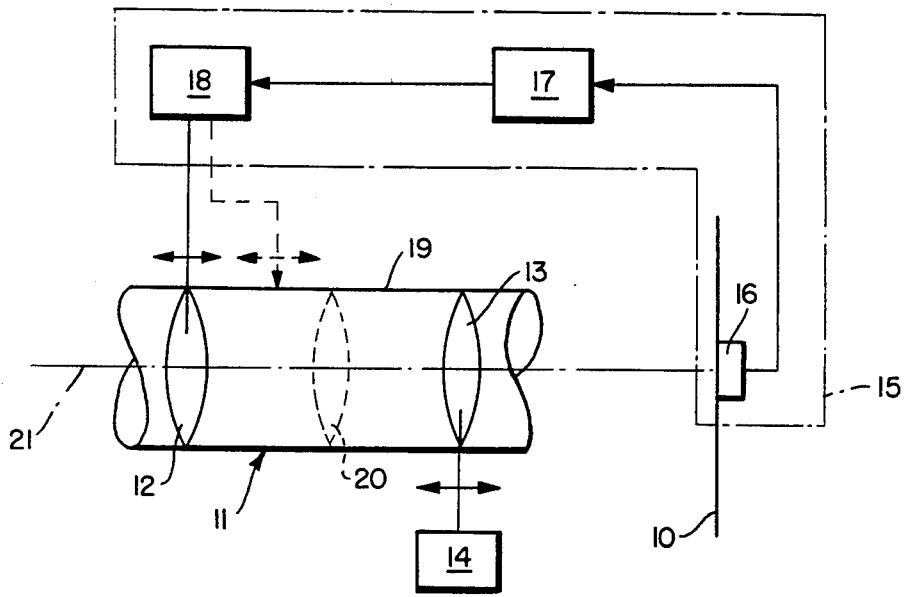
FIG. 2 is a schematic representation of an optical imaging system.

FIG. 2 is a schematic representation of an imaging system having a variable focal length and producing the image of an object on a fixed image plane 10. Such an imaging system may be a zoom lens in a photographic camera.

The optical imaging system has a lens system 11 projecting an image on the spatially fixed image plane 10 and containing two or more lenses or lens components 12, 13 and 20. These two lenses or lens components 12, 13 are arranged in series on the optical axis 21 indicated by the dash-dotted line. The interval between the lenses or lens components 12, 13 may be varied to adjust the focal length of the lens system 11. To this end, a manual or motor-operated focusing device 14 is provided. The term "lens component" may be used generally to denote an optical surface, a single lens, or an assemblage of lenses, as would be evident to a skilled worker in the art.

The focusing device 14 acts on one of the two lenses or lens components 12, 13, in this case on the rear lens or lens component 13 closest to the image plane 10, enabling the latter to be adjusted independently of the front lens or lens component 12. In this sense, the two lenses or lens components 12 and 13 are mechanically decoupled in relation to the focusing device 14, that is to say, an adjustment of the rear lens or lens component 13 causes no adjustment of the front lens or lens component 12 as a direct result of setting the focusing device 14.

In the embodiment of FIG. 2, the optical imaging system also has a focusing device 15 connected to the front lens or lens component 12. This focusing device 15 adjusts the front lens or lens component 12 until the focal plane of the lens system 11 lies essentially in the image plane 10, so that the object is sharply imaged. To this end, the focusing device 15 has at least one photosensitive sensor 16, a regulator 17 and a final controlling element 18, which is preferably motor-operated and which acts on the front lens or lens component 12. Such a focusing device is already known and widely used in cameras. It may contain a known rangefinder having a base on the camera, a known ultrasonic travel-time measuring device, a known travel-time measuring device using invisible laser light or the like. All these types of focusing equipment are suitable for use in the optical imaging system according to the invention.

In the embodiment described above, both lenses or lens components 12, 13 are positioned in a mount 19 with allowance for sliding axially therein independently of one another. Usually, other lenses or lens components 20 are fixedly arranged in the mount 19. By means of the adjusting device 14 the rear lens or lens component 13, and, by means of the focusing device 15, the front lens or lens component 12 are moved in the mount 19. Thus, both lenses or lens components 12, 13 are in a sense detached from one another during the focusing by setting the device 14 in a manner that is convenient for setting the zoom condition.

It is also possible to design the system in such a way that the focusing device 15 or its final controlling element 18 does not act on the front lens or lens component 12, but on the whole lens system 11. In this case, during the focusing of the lens system 11 via the focusing device 15, an overall adjustment of the lens system 11 is accomplished, during which the previously set position of the rear lens or lens component 13 relative to the front lens or lens component 12 is maintained without change. In this instance, both lenses or lens components 12, 13 continue to be mechanically decoupled with respect to the adjusting device 14, but with respect to the focusing device 15 and its final controlling element 18 they are rigidly coupled with one another and with the other lenses or lens components 20 of the lens system 11. Thus, actuation of the adjusting device 14 results in a shifting of the rear lens or lens component 13 within the lens system 11, while operating the final controlling element 18 via the regulator 17 of the focusing device 15 results in a displacement of the whole lens system with respect to the fixed image plane 10, including the rear lens or lens component 13.

The invention is not limited to the embodiments described herein. Thus, the adjusting device 14 may also act on the front lens or lens component 12, while the focusing device 15 is coupled with the rear lens or lens component 13 or with the whole lens system 11. This adjustment of the rear lens or lens component 13 via the focusing device 15 offers the advantage of a shorter distance to the image plane 10 and, thereby, a smaller displacement of the lens or lens component 13 during the setting of the same focal length. Thus, the final controlling element 18 of the focusing device 15 need only be designed for small adjusting paths.

In addition, the invention is not restricted to mechanically compensated imaging systems, but may also be applied to optically compensated imaging systems through appropriate constructions.

I claim, wherein the reference characters corresponding to elements in the figures are intended only as exemplary and non-limiting:

1. An optical imaging system of variable focal length including a lens system (11) for forming an image in a fixed image plane (10) with at least two series-connected lens components (12, 13) located along the optical axis, the positions of the two lens components (12, 13) being variable, and including an adjusting device (14) for setting the focal length of the lens system (11), said imaging system comprising said adjusting device (14) comprising means for acting on one of the two lens components (12, 13) independently of the other of said two lens components (13, 12), and a focusing device (15) coupled at least with the other one of said lens components (13, 12) to focus the lens system (11) to form a sharp image on the image plane (10).

2. The imaging system of claim 1, said focusing device (15) comprising automatic focusing means for coupling both said two series connected lens components (12, 13) to control the position of at least said other one of said lens components (13, 12).

3. The imaging system of claim 1, the focusing device (15) comprising at least one photosensitive sensor (16) arranged in the image plane (10), a final controlling element (18) acting selectively on at least said other one of the two lens components (13, 12) that is not adjusted by said adjusting device (14), and a regulator (17) for selectively actuating the final controlling element (18) as a function at least of a signal from the sensor (16).

4. The imaging system of claim 2, the focusing device (15) comprising at least one photosensitive sensor (16) arranged in the image plane (10), a final controlling element (18) acting selectively on at least said other of the two lens components (13, 12) that is not adjusted by said adjusting device (14), and a regulator (17) for selectively actuating the final controlling element (18) as a function at least of a signal from the sensor (16).

5. The imaging system of claim 1, 2, 3 or 4 comprising an imaging system for a movie camera.

6. The imaging system of claim 1, 2, 3 or 4 comprising means for optical compensation.

7. The imaging system of claim 1, 2, 3 or 4 comprising means for mechanial compensation.

8. The imaging system of claim 1, 2, 3 or 4, said focusing device (15) comprising a rangefinder.

9. The imaging system of claim 1, 2, 3 or 4, said focusing detector (15) comprising a travel time measuring device.

10. The imaging system of claim 1, 2, 3 or 4, said adjusting device (14) acting on the one of said two series-connected lens components (13) that is closest to said image plane (10).

11. The imaging system of claim 1, 2, 3 or 4, said adjusting device (14) acting on the one of said two series-connected lens components (12) that is farthest from said image plane (10).

12. The imaging system of claim 1, 2, 3 or 4, said lens system (11) comprising at least one additional series-connected lens component (20) located along said optical axis, each said additional lens component (20) being fixed at a predetermined position within said lens system (11), the positions of at least one of said two series-connected lens components (12, 13) being variable within said lens system (11).

13. The imaging system of claim 3 or 4, said regulator (17) activating the final controlling element (18) also as a function of a manual set control on said regulator.

14. The imaging system of claim 3 or 4, said photosensitive sensor (16) being located in a plane that is conjugate to said image plane (10).

* * * * *

UNITED STATES PATENT AND TRADEMARK OFFICE
CERTIFICATE OF CORRECTION

PATENT NO. : 4,329,578

DATED : 11 May 1982

INVENTOR(S) : ORTWIN ROSNER

It is certified that error appears in the above-identified patent and that said Letters Patent is hereby corrected as shown below:

Front page, [73] Assignee, line 2, "Brunswick" should be --Braunschweig--.

Signed and Sealed this

Seventh Day of September 1982

[SEAL]

Attest:

GERALD J. MOSSINGHOFF

Attesting Officer     Commissioner of Patents and Trademarks